(12) United States Patent
Slipenchuk (10) Patent No.: US 11,755,700 B2
(45) Date of Patent: Sep. 12, 2023

(54) METHOD FOR CLASSIFYING USER ACTION SEQUENCE

(71) Applicant: Group IB, Ltd, Moscow (RU)

(72) Inventor: Pavel Vladimirovich Slipenchuk, Moscow (RU)

(73) Assignee: GROUP IB, LTD, Moscow (RU)

( * ) Notice: Subject to any disclaimer, the term of this patent is extended or adjusted under 35 U.S.C. 154(b) by 1259 days.

(21) Appl. No.: 16/194,578

(22) Filed: Nov. 19, 2018

(65) Prior Publication Data
US 2019/0156160 A1 May 23, 2019

(30) Foreign Application Priority Data
Nov. 21, 2017 (RU) .............................. RU2017140501

(51) Int. Cl.
*G06K 9/62* (2022.01)
*G06F 3/0481* (2022.01)
(Continued)

(52) U.S. Cl.
CPC .......... *G06F 21/316* (2013.01); *G06F 3/0481* (2013.01); *G06F 18/214* (2023.01);
(Continued)

(58) Field of Classification Search
CPC .............. G06K 9/6282; G06K 9/6256; G06K 9/00496; G06K 9/628; G06N 20/20;
(Continued)

(56) References Cited

U.S. PATENT DOCUMENTS 7,225,343 B1 5/2007 Honig et al.
7,496,628 B2 2/2009 Arnold et al.
(Continued)

FOREIGN PATENT DOCUMENTS

CA 2606326 A1 * 11/2006 ........... G06F 21/316
CN 103491205 A 1/2014
(Continued)

OTHER PUBLICATIONS

Brownlee, Jason How To Implement The Decision Tree Algorithm From Scratch In Python (all pages) (Year: 2016).*
(Continued)

*Primary Examiner* — Cesar B Paula
*Assistant Examiner* — Carl E Barnes, Jr.
(74) *Attorney, Agent, or Firm* — BCF LLP (57) ABSTRACT

There is disclosed a method for training a Machine Learning Algorithm (MLA) for classifying a user action sequence that is performed by a user with an electronic service on a computer device. The method comprises: receiving an indication of interface elements of the electronic service and events associated with the interface elements to be monitored; receiving a plurality of indications of the user action sequence, the plurality of indications being of at least two different types of classes, for which the MLA is to be trained for classifying user actions into; generating a training set by: subdividing the given user action sequence into subsequences, determining a frequency of each subsequence appearing in the user action sequences belonging to a given one of the at least two different types of classes; scoring each subsequence based on the frequency; selecting n most informative subsequences.

16 Claims, 3 Drawing Sheets

(51) Int. Cl.

| | | |
|---|---|---|
| *G06F 21/31* | (2013.01) | |
| *G06N 20/00* | (2019.01) | |
| *G06N 20/20* | (2019.01) | |
| *G06F 18/243* | (2023.01) | |
| *G06F 18/214* | (2023.01) | |
| *G06F 18/2431* | (2023.01) | |
| *G06N 5/01* | (2023.01) | |
| *G06N 20/10* | (2019.01) | |

(52) U.S. Cl.
CPC .... *G06F 18/2431* (2023.01); *G06F 18/24323* (2023.01); *G06N 5/01* (2023.01); *G06N 20/00* (2019.01); *G06N 20/20* (2019.01); *G06F 2218/00* (2023.01); *G06N 20/10* (2019.01)

(58) Field of Classification Search
CPC ........ G06N 20/10; G06N 20/00; G06N 5/003; G06N 5/01; G06F 3/0481; G06F 21/316; G06F 18/24323; G06F 18/214; G06F 18/2431; G06F 2218/00
See application file for complete search history.

(56) References Cited

U.S. PATENT DOCUMENTS

| | | | |
|---|---|---|---|
| 7,631,362 | B2 | 12/2009 | Ramsey |
| 7,712,136 | B2 | 5/2010 | Sprosts et al. |
| 7,730,040 | B2 | 6/2010 | Reasor et al. |
| 7,865,953 | B1 | 1/2011 | Hsieh et al. |
| 7,958,555 | B1 | 6/2011 | Chen et al. |
| 7,984,500 | B1 | 7/2011 | Khanna et al. |
| 8,132,250 | B2 | 3/2012 | Judge et al. |
| 8,151,341 | B1 | 4/2012 | Gudov |
| 8,255,532 | B2 | 8/2012 | Smith-Mickelson et al. |
| 8,260,914 | B1 | 9/2012 | Ranjan |
| 8,285,830 | B1 | 10/2012 | Stout et al. |
| 8,402,543 | B1 | 3/2013 | Ranjan et al. |
| 8,448,245 | B2 | 5/2013 | Banerjee et al. |
| 8,532,382 | B1 | 9/2013 | Ioffe |
| 8,539,582 | B1 | 9/2013 | Aziz et al. |
| 8,555,388 | B1 | 10/2013 | Wang et al. |
| 8,561,177 | B1 | 10/2013 | Aziz et al. |
| 8,600,993 | B1 | 12/2013 | Gupta et al. |
| 8,606,725 | B1 | 12/2013 | Agichtein et al. |
| 8,612,463 | B2 | 12/2013 | Brdiczka et al. |
| 8,625,033 | B1 | 1/2014 | Marwood et al. |
| 8,635,696 | B1 | 1/2014 | Aziz |
| 8,650,080 | B2 | 2/2014 | O'Connell et al. |
| 8,660,296 | B1 | 2/2014 | Ioffe |
| 8,677,472 | B1 | 3/2014 | Dotan et al. |
| 8,776,229 | B1 | 7/2014 | Aziz |
| 8,850,571 | B2 | 9/2014 | Staniford et al. |
| 8,856,937 | B1 | 10/2014 | Wüest et al. |
| 8,972,412 | B1 | 3/2015 | Christian et al. |
| 8,984,640 | B1 | 3/2015 | Emigh et al. |
| 9,026,840 | B1 | 5/2015 | Kim |
| 9,060,018 | B1 | 6/2015 | Yu et al. |
| 9,185,095 | B1 | 11/2015 | Moritz et al. |
| 9,210,111 | B2 | 12/2015 | Chasin et al. |
| 9,215,239 | B1 | 12/2015 | Wang et al. |
| 9,253,208 | B1 | 2/2016 | Koshelev |
| 9,330,258 | B1 | 5/2016 | Satish et al. |
| 9,338,181 | B1 | 5/2016 | Burns et al. |
| 9,357,469 | B2 | 5/2016 | Smith et al. |
| 9,456,000 | B1 | 9/2016 | Spiro et al. |
| 9,590,986 | B2 | 3/2017 | Zizi et al. |
| 9,654,593 | B2 | 5/2017 | Parg et al. |
| 9,723,344 | B1 | 8/2017 | Granström et al. |
| 9,736,178 | B1 | 8/2017 | Ashley |
| 9,917,852 | B1 | 3/2018 | Xu et al. |
| 9,934,376 | B1 | 4/2018 | Ismael |
| 2002/0112048 | A1 | 8/2002 | Gruyer et al. |
| 2002/0161862 | A1 | 10/2002 | Horvitz |
| 2003/0009696 | A1 | 1/2003 | Bunker et al. |
| 2006/0074858 | A1 | 4/2006 | Etzold et al. |
| 2006/0107321 | A1 | 5/2006 | Tzadikario |
| 2006/0224898 | A1 | 10/2006 | Ahmed |
| 2006/0253582 | A1 | 11/2006 | Dixon et al. |
| 2007/0019543 | A1 | 1/2007 | Wei et al. |
| 2007/0101155 | A1 | 5/2007 | Hoghaug et al. |
| 2007/0239999 | A1 | 10/2007 | Honig et al. |
| 2008/0222712 | A1 | 9/2008 | O'Connell et al. |
| 2009/0138342 | A1 | 5/2009 | Otto et al. |
| 2009/0281852 | A1 | 11/2009 | Abhari et al. |
| 2009/0292925 | A1 | 11/2009 | Meisel |
| 2010/0011124 | A1 | 1/2010 | Wei et al. |
| 2010/0037314 | A1 | 2/2010 | Perdisci et al. |
| 2010/0076857 | A1 | 3/2010 | Deo et al. |
| 2010/0115620 | A1 | 5/2010 | Alme |
| 2010/0115621 | A1 | 5/2010 | Staniford et al. |
| 2010/0191737 | A1 | 7/2010 | Friedman et al. |
| 2010/0205665 | A1 | 8/2010 | Komili et al. |
| 2010/0235918 | A1 | 9/2010 | Mizrahi et al. |
| 2011/0222787 | A1 | 9/2011 | Thiemert et al. |
| 2012/0030293 | A1 | 2/2012 | Bobotek |
| 2012/0079596 | A1 | 3/2012 | Thomas et al. |
| 2012/0087583 | A1 | 4/2012 | Yang et al. |
| 2012/0158626 | A1 | 6/2012 | Zhu et al. |
| 2012/0233656 | A1 | 9/2012 | Rieschick et al. |
| 2012/0291125 | A1 | 11/2012 | Maria |
| 2013/0086677 | A1 | 4/2013 | Ma et al. |
| 2013/0103666 | A1 | 4/2013 | Sandberg et al. |
| 2013/0111591 | A1 | 5/2013 | Topan et al. |
| 2013/0117848 | A1 | 5/2013 | Golshan et al. |
| 2013/0191364 | A1 | 7/2013 | Kamel et al. |
| 2013/0263264 | A1 | 10/2013 | Klein et al. |
| 2013/0297619 | A1 | 11/2013 | Chandrasekaran et al. |
| 2013/0340080 | A1 | 12/2013 | Gostev et al. |
| 2013/0343616 | A1 | 12/2013 | Forero et al. |
| 2014/0033307 | A1 | 1/2014 | Schmidtler |
| 2014/0058854 | A1 | 2/2014 | Ranganath et al. |
| 2014/0082730 | A1 | 3/2014 | Vashist et al. |
| 2014/0173287 | A1 | 6/2014 | Mizunuma |
| 2014/0310811 | A1 | 10/2014 | Hentunen |
| 2015/0007250 | A1 | 1/2015 | Dicato, Jr. et al. |
| 2015/0049547 | A1 | 2/2015 | Kim |
| 2015/0067839 | A1 | 3/2015 | Wardman et al. |
| 2015/0163242 | A1 | 6/2015 | Laidlaw et al. |
| 2015/0169854 | A1 | 6/2015 | Chang et al. |
| 2015/0170312 | A1 | 6/2015 | Mehta et al. |
| 2015/0200963 | A1 | 7/2015 | Geng et al. |
| 2015/0220735 | A1 | 8/2015 | Paithane et al. |
| 2015/0295945 | A1 | 10/2015 | Canzanese et al. |
| 2015/0310196 | A1* | 10/2015 | Turgeman ........... G06F 3/04842 726/19 |
| 2015/0363791 | A1 | 12/2015 | Raz et al. |
| 2015/0381654 | A1 | 12/2015 | Wang et al. |
| 2016/0036837 | A1 | 2/2016 | Jain et al. |
| 2016/0036838 | A1 | 2/2016 | Jain et al. |
| 2016/0044054 | A1 | 2/2016 | Stiansen et al. |
| 2016/0055490 | A1 | 2/2016 | Keren et al. |
| 2016/0065595 | A1 | 3/2016 | Kim et al. |
| 2016/0112445 | A1 | 4/2016 | Abramowitz |
| 2016/0127907 | A1 | 5/2016 | Baxley et al. |
| 2016/0149943 | A1 | 5/2016 | Kaloroumakis et al. |
| 2016/0171197 | A1 | 6/2016 | Song et al. |
| 2016/0191243 | A1 | 6/2016 | Manning |
| 2016/0205122 | A1 | 7/2016 | Bassett |
| 2016/0205123 | A1 | 7/2016 | Almurayh et al. |
| 2016/0226894 | A1 | 8/2016 | Lee et al. |
| 2016/0253679 | A1 | 9/2016 | Venkatraman et al. |
| 2016/0261628 | A1 | 9/2016 | Doron et al. |
| 2016/0267179 | A1 | 9/2016 | Mei et al. |
| 2016/0285907 | A1 | 9/2016 | Nguyen et al. |
| 2016/0306974 | A1* | 10/2016 | Turgeman ............... H04L 63/08 |
| 2016/0307201 | A1* | 10/2016 | Turgeman ............. G06F 21/552 |
| 2016/0359679 | A1 | 12/2016 | Parandehgheibi et al. |
| 2017/0032250 | A1 | 2/2017 | Chang |
| 2017/0034211 | A1 | 2/2017 | Buergi et al. |
| 2017/0111377 | A1 | 4/2017 | Park et al. |
| 2017/0134401 | A1 | 5/2017 | Medvedovsky et al. |
| 2017/0140279 | A1 | 5/2017 | Turgeman |
| 2017/0142144 | A1 | 5/2017 | Weinberger et al. |

(56) References Cited

U.S. PATENT DOCUMENTS

| | | |
|---|---|---|
| 2017/0149813 A1 | 5/2017 | Wright et al. |
| 2017/0200457 A1 | 7/2017 | Chai et al. |
| 2017/0221064 A1 | 8/2017 | Turgeman et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2018/0322287 A1* | 11/2018 | Zhao ................. G06N 3/08 |
| 2019/0089737 A1 | 3/2019 | Shayevitz et al. |
| 2019/0207973 A1 | 7/2019 | Peng |
| 2019/0373005 A1 | 12/2019 | Bassett |
| 2020/0134702 A1 | 4/2020 | Li |

FOREIGN PATENT DOCUMENTS

| | | |
|---|---|---|
| CN | 104504307 A | 4/2015 |
| CN | 105429956 A | 3/2016 |
| CN | 105897714 A | 8/2016 |
| CN | 106131016 A | 11/2016 |
| CN | 106202482 A | 12/2016 |
| CN | 106355450 A | 1/2017 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| EP | 2477136 B1 | 4/2018 |
| GB | 2437100 A | 10/2007 |
| GB | 2470579 A | 12/2010 |
| GB | 2493514 A | 2/2013 |
| KR | 10-2007-0049514 A | 5/2007 |
| KR | 20090022682 A | 3/2009 |
| KR | 100923179 B1 | 10/2009 |
| KR | 10-1514984 B1 | 4/2015 |
| KR | 20190018197 A | 2/2019 |
| RU | 2333532 C2 | 9/2008 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 172497 U1 | 7/2017 |
| RU | 2625050 C1 | 7/2017 |
| RU | 2628192 C2 | 8/2017 |
| RU | 2636702 C1 | 11/2017 |
| RU | 2649793 C2 | 4/2018 |
| RU | 2670030 C2 | 10/2018 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2011039371 A1 | 4/2011 |
| WO | 2012/015171 A2 | 2/2012 |
| WO | 2017070600 A1 | 4/2017 |
| WO | 2019/010182 A1 | 1/2019 |
| WO | 2019/035491 A1 | 2/2019 |

OTHER PUBLICATIONS

Office Action received with regard to the counterpart U.S. Appl. No. 15/858,032 dated Apr. 6, 2020.

Office Action with regard to the counterpart U.S. Appl. No. 15/707,641 dated Apr. 25, 2019.

Search Report with regard to the counterpart SG Patent Application No. 10201900062S dated Dec. 5, 2019.

Search Report with regard to the counterpart SG Patent Application No. 10201900060Y dated Dec. 5, 2019.

English Abstract for CN 105429956 retrieved on Espacenet on Jan. 7, 2020.

English Abstract for CN 104504307 retrieved on Espacenet on Jan. 7, 2020.

Search Report with regard to the counterpart RU Patent Application No. 2018144708 dated Aug. 16, 2019.

Search Report with regard to the counterpart RU Patent Application No. 2018147431 dated Aug. 15, 2019.

English Translation of KR10-2007-0049514 (Description, Claims) retrieved on Espacenet on Oct. 15, 2019.

English Abstract of KR10-1514984 retrieved on Espacenet on Oct. 15, 2019.

Notice of Allowance with regard to the counterpart U.S. Appl. No. 15/707,641 dated Oct. 30, 2019.

Whyte, "DNS-based Detection of Scanning Worms in an Enterprise Network", Aug. 2004, NOSS, pp. 1-17 (Year: 2005)—cited by Examiner in the Notice of Allowance with regard to the counterpart U.S. Appl. No. 15/707,641.

English Abstract of RU 107616 retrieved on Espacenet on Jul. 3, 2017.

European Search Report with regard to EP17180099 dated Nov. 28, 2017.

European Search Report with regard to EP17191900 dated Jan. 11, 2018.

Yoshioka et al., "Sandbox Analysis with Controlled Internet Connection for Observing Temporal Changes of Malware Behavior", https://www.researchgate.net/publication/254198606, 15 pages.

Yoshioka et al., "Multi-Pass Malware Sandbox Analysis with Controlled Internet Connection", IEICE Transactions On Fundamentals of Electronics, Communications and Computer Sciences, Engineering Sciences Society, Tokyo, 2010, vol. E93A, No. 1, p.p. 210-218.

Wikipedia, "Blockchain", https://en.wikipedia.org/wiki/Blockchain, pdf document, 18 pages.

Search Report with regard to the counterpart RU Patent Application No. 2018101764 dated Jun. 29, 2018.

Search Report with regard to the counterpart RU Patent Application No. 2018101761 dated Jun. 20, 2018.

International Search Report with regard to the counterpart Patent Application No. PCT/RU2016/000526 dated Jun. 1, 2017.

Search Report with regard to the counterpart RU Patent Application No. 2018101760 dated Jun. 22, 2018.

Search Report with regard to the counterpart RU Patent Application No. 2018101759 dated Sep. 7, 2018.

English Abstract of RU129279 retrieved on Espacenet on Sep. 11, 2017.

English Abstract of RU 164629 retrieved on Espacenet on Sep. 11, 2017.

(56) References Cited

OTHER PUBLICATIONS

English Abstract of RU2538292 retrieved on Espacenet on Sep. 11, 2017.
Prakash et al., "PhishNet: Predictive Blacklisting to Detect Phishing Attacks", INFOCON, 2010 Proceedings IEEE, USA, 2010, ISBN: 978-1-4244-5836-3, doc. 22 pages.
Search Report with regard to the counterpart Patent Application No. RU2018105377 dated Oct. 15, 2018.
Search Report with regard to the counterpart RU Patent Application No. 2018101763 dated Jan. 11, 2019.
Search Report with regard to the counterpart RU Patent Application No. 2016137336 dated Jun. 6, 2017.
English Abstract of RU2522019 retrieved on Espacenet on Jan. 25, 2019.
Search Report with regard to the counterpart RU Patent Application No. 2017140501 dated Jul. 11, 2018.
European Search Report with regard to the counterpart EP Patent Application No. EP17210904 dated May 16, 2018.
Notice of Allowance with regard to the counterpart U.S. Appl. No. 15/858,013 dated Jun. 10, 2020.
Office Action with regard to the counterpart U.S. Appl. No. 15/858,013 dated Nov. 22, 2019.
Office Action with regard to the counterpart U.S. Appl. No. 16/261,854 dated Oct. 21, 2019.
Notice of Allowance with regard to the counterpart U.S. Appl. No. 15/858,013 dated May 8, 2020.
Office Action with regard to the counterpart U.S. Appl. No. 16/270,341 dated May 27, 2020.
International Search Report with regard to the counterpart Patent Application No. PCT/RU2019/000232 dated Jan. 9, 2020.
English Abstract for CN 106355450 retrieved on Espacenet on Jan. 4, 2021.
English Abstract for CN 106202482 retrieved on Espacenet on Jan. 4, 2021.
Wikipedia, "Focus (computing)", https://en.wikipedia.org/wiki/Focus_(computing), accessed on Jan. 4, 2021, pdf 5 pages.
Wikipedia, "Collaborative software", https://en.wikipedia.org/wiki/Collaborative_software, accessed on Jan. 4, 2021, pdf 11 pages.
International Search Report with regard to the Patent Application No. PCT/RU2019/000169 dated Dec. 5, 2019.
International Search Report and Written Opinion with regard to the counterpart Patent Application No. PCT/RU2019/000126 dated Nov. 28, 2019.
English Abstract for KR100923179 retrieved on Espacenet on Dec. 3, 2020.
English Abstract for KR20090022682 retrieved on Espacenet on Dec. 3, 2020.
English Abstract for KR20190018197 retrieved on Espacenet on Dec. 3, 2020.
Wikipedia, "Keystroke dynamics", https://en.wikipedia.org/wiki/Keystroke_dynamics, accessed on Jan. 4, 2021, pdf 3 pages.
Wikipedia, "Feature extraction", https://en.wikipedia.org/wiki/Feature_extraction, accessed on Jan. 4, 2021, pdf 7 pages.
Wikipedia, "Scancode", ru.wikipedia.org/w/index.php?title=%D0%A1%D0%BA%D0%B0%D0%BD-%D0%BA%D0%BE%D0%B4&oldid=98124315, accessed on Feb. 8, 2021, pdf 9 pages.
English Translation of CN106713312, ©Questel—FAMPAT, Jul. 17, 2019.
English Translation of CN105897714, ©Questel—FAMPAT, Jul. 17, 2019.
English Translation of CN106506435, ©Questel—FAMPAT, Jul. 26, 2019.
English Translation of CN107392456, ©Questel—FAMPAT, Jul. 29, 2019.
English Translation of CN103491205, ©Questel—FAMPAT, Jul. 29, 2019.
English Translation of CN106131016, ©Questel—FAMPAT, Jul. 17, 2019.
Invitation to Respond to Written Opinion dated Aug. 5, 2019 with regard to the counterpart SG Patent Application No. 10201900339Q.
Invitation to Respond to Written Opinion dated Aug. 5, 2019 with regard to the counterpart SG Patent Application No. 10201901079U.
Invitation to Respond to Written Opinion datedd Jul. 31, 2019 with regard to the counterpart SG Patent Application No. 10201900335P.
Search Report with regard to RU Patent Application No. 2019107535 dated Dec. 13, 2022.
English Description and Claims for RU2333532 retrieved on Espacenet on Dec. 28, 2022.
English Abstract for RU172497 retrieved on Espacenet on Dec. 28, 2022.
Russian Search Report dated Mar. 2, 2023 issued in respect of the counterpart Russian Patent Application No. RU 2019111675.

* cited by examiner

FIG. 1

FIG. 2 obtaining a user action sequence with accompanying events, along with the timestamps of said actions or events

↓ assigning a default class to the action sequence

↓ obtaining time data, user data, and the actual class the given sequence of user actions at the given time belongs to, and replacing its default class with the actual class

↓ generating a training set comprising user action sequences belonging to different classes

↓ subdividing the user action sequences in the training set into subsequences, based on the following parameters: max subsequence length, min subsequence length, number of the most informative features (n)

↓ for each subsequence, determining the frequency of it belonging to each of the classes

↓ scoring each subsequence based on the frequency of it belonging to each of the classes and selecting n most informative subsequences pointing at the probability of a given user action sequence belonging to a specified class

↓ in each user action sequence in the training set, searching for n most informative subsequences to generate a set of Boolean features, where each feature shows whether its corresponding subsequence is present in the given action sequence

↓ submitting the generated set of Boolean features as a training set for the classification algorithm

METHOD FOR CLASSIFYING USER ACTION SEQUENCE

CROSS-REFERENCE

The present application claims convention priority to Russian Utility Patent Application No. 2017140501, filed on Nov. 21, 2017, entitled "METHOD FOR CLASSIFYING USER ACTION SEQUENCE", the entirety of which is incorporated herein by reference.

FIELD OF THE TECHNOLOGY

The present invention relates to the methods for detecting fraud, particularly for training a Machine Learning Algorithm (MLA) to detect fraudulent user actions executed in a computer system.

BACKGROUND

In the recent years, Internet has grown to be a platform where users execute a plethora of actions—from browsing digital content, searching for information, and executing financial transaction with banks and other financial institutions. With the growth of legitimate Internet use, the fraudulent activity using the Internet has also grown. Anti-fraud, or fraud monitoring systems are used to assess financial transactions executed by users using the Internet that may be suspected of fraud. These known systems are also configured to generate recommendations on further processing of the transactions suspected of being fraudulent. Such anti-fraud services are based on pre-determined sets of rules, filters and lists, both standard and custom-built, such that each monitored transaction is checked against them.

Some examples of such used rules include:
- A limit of the number of purchases using the same bank card of by the same user during a specified period of time;
- A limit of the maximum sum of money involved in a single transaction (such as a value of the purchase or a transfer, for example) using a single bank card or by the same user during a specified period of time;
- A limit of the number of bank cards used by the same user during a specified period of time;
- A limit of the number of users using the same bank card;
- An indication and analysis of the purchase histories for each bank card or user (so-called blacklists or whitelists).

A problem with such approach is that it may fail to determine whether an operation is legitimate or fraudulent. For example, a given user may legitimately perform multiple transaction over the pre-determined triggering the rule of the maximum number of transaction within the pre-determined period of time.

Another conventional solution involves use and verification of patterns (also called "signatures"). Such signatures have to be updated regularly in order to allow determining whether an operation is legitimate or fraudulent. Such signatures are generated by a human analyst who analyzes action sequences for fraudulent features and determines their characteristics, which is labor intensive and is susceptible to errors as it may depend on the analyst's competence as well.

SUMMARY

The non-limiting embodiments of the present technology are aimed eliminating the drawbacks of the known solutions. As such, at least some non-limiting embodiments of the present technology allow to automatically and accurately determine features associated with specific operation classes.

Non-limiting embodiments of the present technology have been developed based on developers' appreciation that there exist a marked difference between "user behavior pattern" difference between a legitimate user and a fraudulent user. Taking an example of a web site that provides a banking service (such as an Internet banking portal for a bank). A typical user may have a "legitimate pattern of behavior" when performing Internet banking, for example, access the web banking portal (by typing in or using "complete function" of the browser the user credentials), view some targeted promotions, pay bills, view spending history, review credit card balance, etc. A typical fraudulent behavior of a malicious individual may have a very different pattern—enter the web site by using a complete function of the browser, and enters the transfer page and transfers users fund in order to steal them, and then exists the web service.

By collecting information about past fraudulent events (as well as legitimate user patterns), it is possible to generate a training set to train a Machine Learning Algorithm (MLA) to analyze a user's behavior and determine when the user's behavior pattern changes form legitimate to potential fraudulent to flag the user's generated transaction for review by an administrator (such as a fraud department employee). Non-limiting embodiments of the present technology are based on training the MLA based on those sub-portions of the behavior patterns that are most indicative of fraudulent behavior (i.e. the ones that correlate most strongly to fraudulent behavior).

In some non-limiting embodiments of the present technology the number of most information subsequences (N) can be in a range of between about 500 and about 700 subsequences. It should be noted that this number is not limited and is selected for each specific electronic service to maximize the likelihood of an accurate prediction, in use. The number (N) can be selected on those sub-sequences that are most frequently associated with a given class to be predicted as opposed class to be predicted.

As such, in a accordance with a first broad aspect of the present technology, there is provided a method for training a Machine Learning Algorithm (MLA), the MLA executed by a server, the MLA for classifying a user action sequence that is performed by a user with an electronic service using a computer device, the method executable by the server. The method comprises: receiving an indication of interface elements of the electronic service and events associated with the interface elements to be monitored; receiving a plurality of indications of the user action sequence, the user action sequence including occurrence of at least one of: (i) events associated with the interface elements and (ii) user interactions with the interface elements; and associated timestamps, the plurality of indications being of at least two different types of classes, for which the MLA is to be trained for classifying user actions into; generating a training set comprising user action sequences belonging to the at least two different types of classes; the generating a given training set having a given user action sequence including: subdividing the given user action sequence into subsequences, the subdividing being based on a pre-determined set of: max subsequence length, min subsequence length; determining a frequency of each subsequence appearing in the user action sequences belonging to a given one of the at least two different types of classes; scoring each subsequence based on the frequency; selecting n most informative subsequences indicative at the probability of the associated given user action sequence belonging to the given one of the at least two different types of classes; using the training set to train the MLA to classify an in-use user action sequence into one of the at least two types of classes.

In some implementations of the method, the sub-dividing of the given user sequence into subsequences is further based on a number of the most informative features (n).

In some implementations of the method, the subdividing the given user action sequence into subsequences further comprises: in each user action sequence in the training set, searching for n most informative subsequences to generate a set of Boolean features, where each Boolean feature is indicative of whether its corresponding subsequence is present in the given action sequence; and wherein the Boolean feature is used as part of the training set.

In some implementations of the method, the receiving the plurality of indications of the user action sequence comprises receiving the plurality of indications of past user actions that have been marked as belonging to at least two types of classes.

In some implementations of the method, the at least two types of classes comprise one of a legitimate transaction class and a fraudulent transaction class.

In some implementations of the method, the number of the most informative features (n) is pre-defined.

In some implementations of the method, the method further comprises pre-defining the number (n).

In some implementations of the method, the pre-defining the number (n) using a scoring function.

In some implementations of the method, scoring comprises applying a scored using Gini index $(1-\Sigma_{i=1}^{k}p_i^2$, where k is the number of classes, and pi is the share of the [i] class.

In some implementations of the method, the MLA is a classifier.

In some implementations of the method, the classifier is based on a decision tree model.

In accordance with another broad aspect of the present technology there is provided a method for classifying a user action sequence that is performed by a user on a computer device in association with an electronic service, the method being executed by a trained Machine Learning Algorithm (MLA), the MLA executed by an electronic device. The method comprises: obtaining a user action sequence, the user action sequence defined by at least one event associated with the user interaction with interface elements of the electronic service; assigning the user action sequence a default class; analyzing the user action sequence by: subdividing the given user action sequence into subsequences, the subdividing being based on a pre-determined set of: max subsequence length, min subsequence length, a number of the most informative features (n); submitting the generated subsequence to the MLA to be used by the MLA to predict a predicted class associated with the user action sequence; in response to the predicted class being different from the default class, generating a trigger indicative of the user action sequence requiring a remedial action.

In some implementations of the method, in response to the predicted class being the same as the default class, repeating the method with a next indication of the user action.

In some implementations of the method, the method further comprises training the MLA using the method of claim 1.

In some implementations of the method, the electronic device is one of a user electronic device used for executing the user action sequence and a server executing the electronic service.

In some implementations of the method, the electronic service is an on-line banking application and wherein the method is executable while the user is performing user interactions with the on-line banking application.

In accordance with yet further non-limiting embodiments of the present technology, there is provided a method for classifying user action sequence that is performed on a computer device. The comprises the following steps:

setting triggers on interface elements and events associated with those elements and other user actions;

recording a user action sequence with accompanying events, along with the timestamps of said actions or events, and assigning a default class to the sequence;

obtaining time data, user data, and the actual class the given sequence of user actions at the given time belongs to, and replacing its default class with the actual class;

generating a training set comprising user action sequences belonging to different classes;

subdividing the user action sequences in the training set into subsequences, based on the following parameters: max subsequence length, min subsequence length, number of the most informative features (n);

for each subsequence, determining the frequency of it belonging to each of the classes;

scoring each subsequence based on the frequency of it belonging to each of the classes and selecting n most informative subsequences pointing at the probability of a given user action sequence belonging to a specified class;

in each user action sequence in the training set, searching for n most informative subsequences to generate a set of Boolean features, where each feature shows whether its corresponding subsequence is present in the given action sequence; and submitting the generated set of Boolean features as a training set for the classification algorithm.

In accordance with another broad aspect of the present technology, there is provided a method for classifying user action sequence that is performed on a computer device. The method comprises the following steps:

obtaining a user action sequence with accompanying events, along with the timestamps of said actions or events;

assigning a default class to the action sequence;

obtaining time data, user data, and the actual class the given sequence of user actions at the given time belongs to, and replacing its default class with the actual class;

generating a training set comprising user action sequences belonging to different classes;

subdividing the user action sequences in the training set into subsequences, based on the following parameters: max subsequence length, min subsequence length, number of the most informative features (n);

for each subsequence, determining the frequency of it belonging to each of the classes;

scoring each subsequence based on the frequency of it belonging to each of the classes and selecting n most informative subsequences pointing at the probability of a given user action sequence belonging to a specified class;

in each user action sequence in the training set, searching for n most informative subsequences to generate a set of Boolean features, where each feature shows whether its corresponding subsequence is present in the given action sequence; and submitting the generated set of Boolean features as a training set for the classification algorithm.

DETAILED DESCRIPTION OF THE NON-LIMITING EMBODIMENTS OF THE TECHNOLOGY

Figure 1:
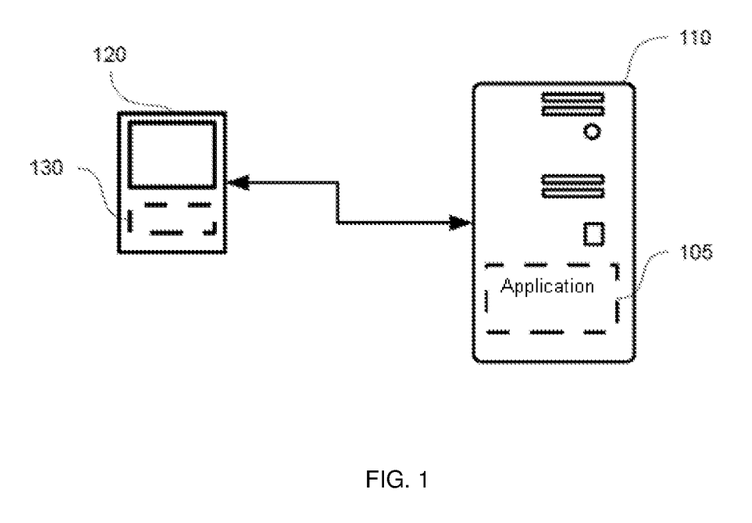
FIG. 1 depicts a schematic representation of system implemented according to non-limiting embodiments of the present technology.
Figure 2:
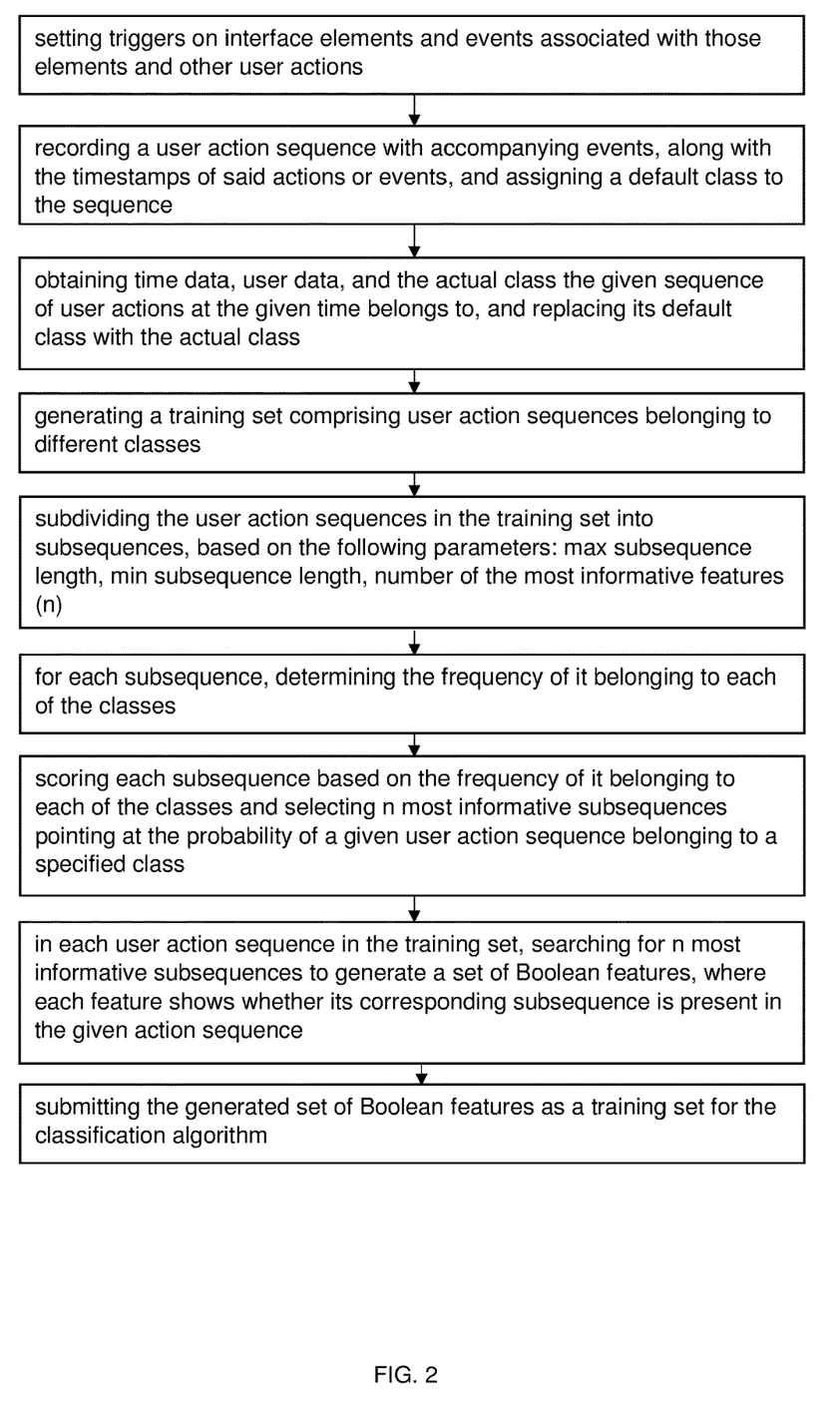
FIG. 2 depicts a block diagram of a flowchart of a method according to some non-limiting embodiments of the present technology, the method executable by the system of FIG. 1.
Figure 3:
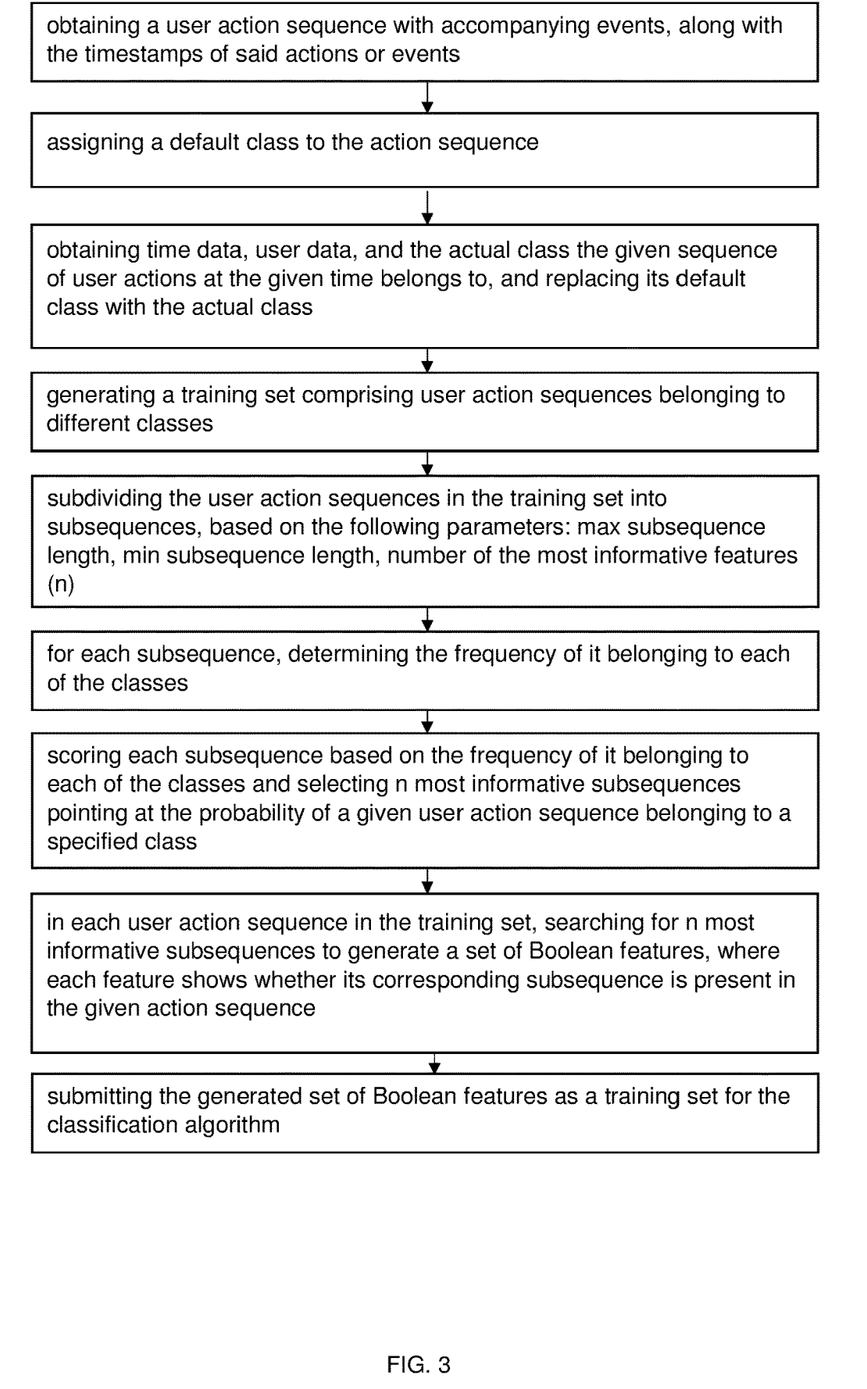
FIG. 3 depicts a block diagram of a flowchart of a method according to some other non-limiting embodiments of the present technology, the method executable by the system of FIG. 1.

With reference to FIG. 1, there is depicted a system (not separately numbered) implemented in accordance to the non-limiting embodiments of the present technology. The system includes a server 110 that can host a bank web site 105. The bank web site 105 is configured to allow a user (not depicted) to access a personal account (such as a bank account) using an electronic device 120, which electronic device 120 is configured to execute an application 130. The application 130 can be a browser or a dedicated app for allowing the user to access the bank web site 105. In other words, users can view website pages hosted by the server 130 using personal devices 120 via the application 130, e.g. a web browser or a mobile banking app. In accordance with the non-limiting embodiments of the present technology, the system of FIG. 1 is configured to analyze user actions have to determine if they are legitimate or fraudulence.

In some embodiments, personal devices 120 may be implemented (but are not so limited), a smartphone, a tablet, a PDA, a laptop, or a desktop PC.

In order to enable the system of FIG. 1 to determine whether a user action is legitimate or fraudulent, for each website page (or screen in the mobile application), the system of FIG. 1 can receive an indication of user interface elements and events to be tracked. These elements can be defined, for example, by an operator of the system of FIG. 1. The identification of these elements and events, in a sense, flags to the system of FIG. 1 which interface elements and events track based on at least some of: triggers for user interactions with said elements and/or for occurrence of said events.

As an example, where a given bank web site, the so-determined events may include (but are not limited to):
User entering a registration page;
User executing a registration using the registration page;
The registration page providing a registration confirmation;
The registration page providing a registration error;
A registration timeout;
User entering a main (landing) page;
User executing a transfer to another client of the bank;
User executing a transfer to a client of another bank;
User executing a transfer to an organization having a pre-determined <Name>;
User executing a payments to mobile providers;
The system providing a money transfer confirmation;
The system executing a check issue;
User entering a wrong password;
The system providing a timeout error;
User viewing settings of the account/web access;
User viewing information about an insurance policy;
User viewing a card activity;
User viewing an account activity;
User viewing a deposit activity;
User viewing a credit card activity;
User exiting the on-line banking system;
User executing a phone credit recharge.
User actions may include the following:
User selecting an interface element;
User clicking a left/right mouse button;
User browsing through website pages or application screens (e.g. pages of remote banking);
User switching between browser frames or application tabs;
User clicking a button;
User clicking a check button or radio button element;
User editing an input field, or selecting a list item;
User pressing a pre-defined (i.e. any) key.

The system of FIG. 1 is configured, in response to any of the above triggers (i.e. actions or events) being set off in the application 130, the system of FIG. 1 (whether the application 130 or a server 110) stores the data that are associated with that user action or event on the server 110. An example of the data entry: <event_MouseClick>, <01/09/2017 17:53>, <29073>, i.e. a mouse click event occurred at 17:53 on 01/09/2017 in the session of the user 29073.

In some alternative embodiments, the trigger can cause storing the data that is associated with the user action or event on the user device 120.

In some embodiments, events and user actions have codes (e.g. symbols or numbers) associated with them. For instance, the <event_MouseClick> event may be stored as a number, or as a sequence of digits and/or letters.

User ID or other identification data are sent from the server 110 or other servers/systems that identify users (indirectly, as well) to the user device 120.

Interacting with a website, users utilize various interface elements and perform various actions that set off triggers, and their action sequences are recorded along with the events accompanying them.

For example, a user 34029 (a non-limiting example of a user ID) may have the following action sequence when interacting with a website on their device 120:

<login>, <22/09/2017 16:49:39>, <34092>
<click_Payment>, <22/09/2017 16:49:43>, <34092>
<transfer_Money>, <22/09/2017 16:50:14>, <34092>

Such user action sequences are stored on the server 110, or, in some embodiments, on the user device 120, and also have a default class (e.g. legitimate action class (G)) assigned to them.

The number of classes depends on the task to be addressed by the trained MLA. In some embodiments, the following classes are contemplated: F—fraudulent actions, and G—legitimate actions; or, e.g. actions of the user under analysis and actions of all other users; or human actions and bot actions; etc.

In some embodiments of the present technology, at least two (i.e. two or more; three or more, etc.) classes can be defined. For example, a class may comprise the actions of each user, or it may comprise the actions of a group of users, such as children, adults, the elderly. In some non-limiting embodiments of the present classes the default class is assigned based on historical statistical data. As an example only, for a given banking/financial service, the historical data may indicate that 99.95% of users are legitimate users and only 0.05% of users are fraudulent transaction generators. In this example, the default class can be defined as the "legitimate user" (or class G in this example).

If, at some point, it is determined that a user was compromised, i.e. an action or a sequence of actions were performed by a non-authorized third party or a bot, then the server 110 (or, in some embodiments, the user device 120) can determine the compromised action sequence and assign it to the class of fraudulent actions (F).

The sequences comprising user actions of different classes make up a training set that is then used to train the MLA to automatically detect fraudulent actions.

In order to automatically detect fraudulent actions, the following steps are executed within the framework of the system of FIG. 1:

User action sequences are subdivided into subsequences. In some embodiments of the present technology, subdivision can be based on the following parameters: max subsequence length (max_subsequence_length), min subsequence length (min_subsequence_length), number of the most informative features (n). At this step, the classes, to which each subsequence belongs, have already been identified/selected.

It should be noted that the parameters above may be set directly by the administrator of the server 110, e.g. based on their past experience, using A/B experiments, using other known factors.

In those embodiments where the method is implemented on the user device 120, the parameters above may be set by developers or they may be obtained from a settings server (not depicted).

For instance, in some-non limiting embodiments of the present technology, the parameters may be empirically set (particularly, defined). An example of such approach would be to try every reasonable value, wherein the final result is the proof of reasonableness of the output. For instance, the administrator may set max and min values for each parameter and then choose the best ones.

In some embodiments of the present technology, the following non-limiting examples for dividing the action sequence may be used:

- max_subsequence_length = 6, i.e. max length of a subsequence is 6 in this example;
- min_subsequence_length = 3, i.e. min length of a subsequence is 3 in this example;
- n = 400, i.e. the number of features is 400 in this example.

Let's assume that there is a coded action sequence (s)=ABFDSAAADOO, wherein each symbol represents a users action or an accompanying event (other attributes, such as timestamps, or user ID, are not taken into account for the purposes of this illustration). This sequence is subdivided into subsequences that have a maximum length of max_subsequence_length=6, which results in the following set: {ABFDSA, BFDSAA, FDSAAA, DSAAAD, SAAADO, AAADOO}.

Each element of this set is then also subdivided in all possible variations of subsequences that have a minimum length of not less than min_subsequence_length, starting from the beginning of the coded user action sequence:

ABFDSA --> {ABF, ABFD, ABFDS, ABFDSA}
BPDSAA --> {BFD, BFDS, BFDSA, BFDSAA}
...
AAADOO --> {AAA, AAAD, AAADO, AAADOO}.

For the last subsequence AAADOO, its endings {AADOO, ADOO, DOO} will also be generated Then, a general set may be selected, particularly, an ordered set (A) that combines every other set ({ABF, ABFD, ABFDS, ABFDSA}, {BFD, BFDS, BFDSA, BFDSAA}, . . . {AAA, AAAD, AAADO, AAADOO}, {AADOO, ADOO, DOO}) into one, wherein the general set (A) comprises the elements a(1), a(2), . . . , a(U), where U is the power (number of elements) of the general set (A). Please note that each user action sequence will have its own general set (A).

The server 110 (or, in some embodiments, the user device 120) determines the frequency of each element in the set (A) appearing in a specific class (e.g. the legitimate action class or the fraudulent action class, in case these two classes are used). For instance, the sequence ABFDS may appear 500 times among fraudulent sequences, and just 10 times among legitimate ones.

In some non-limiting embodiments of the present technology, the server analyzes the frequency of appearance of each element in a body of past observed fraudulent and legitimate transactions. In other words, the server 110 may have access to a body of past observed interactions, where the interactions were marked as actually fraudulent (for example by a fraud department of a financial institution) or legitimate. This step allows the server 110 to determine (broadly speaking) of the given element in the set (A) is more likely to be associated with fraudulent transaction or a legitimate one.

Then, the server 110 (or, in some embodiments, the user device 120) scores each element in the set (A) taking into account its frequency of appearing in each of the classes, selecting a pre-determined number of N most informative elements that are indicative of the probability of the element in the set (user action subsequence) belonging to the given class. In accordance with the non-limiting embodiments the most informative are those elements that are better correlated to the determination of the nature of the given transaction (fraudulent or legitimate, as an example). How the N-most informative element is selected will be described in greater detail herein below.

In some embodiments, the elements are scored using Gini index $(1-\Sigma_{i=1}^{k}p_i^2)$, where k is the number of classes (e.g. two classes: legitimate actions and fraudulent actions), and pi is the share of the [i] class.

In other embodiments, elements are scored using the number of fraudulent sequences.

In yet other embodiments, elements are scored using the number of legitimate sequences.

Then, the server 110 (or, in some embodiments, the user device 120) searches for n most indicative elements that have been selected earlier in the set (A) for each user action sequence in the training set, thus generating a set of boolean features (a set of n-sized vectors), where each vector element (feature) marks that this element (subsequence) is a part of a given action sequence.

For the illustration to be presented herein below, let it be assume that the resultant training set can contain, for example, the following user action sequence (A): ABFFAADOSDOOG. Using this as a non-limiting example, an illustration of various routines of the non-limiting embodiments of the present technology will now be presented.

An example of feature generation: there are three subsequences (elements in the set A) that are the most indicative ones: DOO, BFDSA, AAD (at n=3). There will be n selected features.

For this action sequence, the server 110 (or, in some embodiments, the user device 120) conducts a search for DOO, BFDSA, and AAD subsequences, thus generating a set (vector) of n (three, in this example) Boolean features {1, 0, 1}, where 1 means that the given subsequence is present in the sequence, and 0 means it does not.

In some embodiments, in order to improve efficiency, a unique Boolean function (f1, f2, ... fn) is generated for each selected indicative feature, the function determining whether the given feature is present in the user action sequence or not.

The generated set of feature vectors, together with the vector classes, is then inputted into the classification algorithm (machine learning algorithm) as a training set.

The training set can contain sets of features that were reliably identified as belonging to different classes, i.e. feature vectors of legitimate action sequences and feature vectors of fraudulent action sequences.

Machine learning algorithms may include, but are not limited to, the Random Forest algorithm, the Support Vector Machine (SVM), or any other classification algorithm, including classifier ensembles.

After the classifier (classifier ensemble) has been trained, the server 110 (or, in some embodiments, the user device 120) can be considered to be trained to be able to use this classifier to determine whether user actions are legitimate or not. In case user actions have been identified as not legitimate (fraudulent), the server 110 is configured to take corresponding measures, such as to block the user, cancel an operation, etc., whatever is appropriate in a given situation.

As a rule, after the classifier (classifier ensemble) has been trained, the server 110 determines the class the in-use user action sequence belongs to, as follows:

recording the user action sequence; determining the vector of Boolean features using n informative features of the sequence in question, selected before; passing the vector over to the trained classifier, which then returns a priori probabilities of the sequence in question belonging to each of the classes.

It should be noted that, in a non-limiting embodiment, a training set of no less than 2000 fraud facts over the recent days (e.g. 90 days) should be used in order to reliably detect fraudulent actions.

For instance, the training set may be created using data collected over the past several days, e.g. days 85-90. Such data are used to train the classifier, particularly by means of machine learning. Then, the training results are applied to the data from days 1st-5th of the exemplary range in order to test the classifier. Please note that the training may be repeated regularly, e.g. once a week.

Reliability of scoring (particularly, the scoring function) may be increased by creating an ensemble made up of several classifiers, e.g. three classifiers. In this case, for example, the first classifier is trained using the data from days (−90)-(−5); the second classifier is trained using the data from days (−97)-(−13); and the third classifier is trained using the data from days (−104)-(−19)/The final scoring or a classifier ensemble may be calculated using the Kolmogorov mean (see en.wikipedia.org/wiki/Quasi-arithmetic_mean). For instance, an arithmetic mean can be calculated.

We will now turn our attention to the non-limiting examples of implementation of how the most informative feature can be selected. It should be noted that the scoring function (used for scoring calculations) is an example of a function for determining informativity. This can be illustrated by the calc_score function (shown below) that is written in Python:

```python
def calc_score(g_count, f_count, ratio):
    """
    Scoring function
    :param g_count: legal number
```

```
    :param f_count: fraudulent number
    :param ratio: the ratio between the total number of legitimate
actions and the total number of fraudulent actions
    :return: number
    0 -- equivocal
    >0 -- likely fraudulent
    <0 -- likely legitimate
    The farther the value is from zero, the likelier its classification is.
    """
    if g_count == 0 and f_count == 0:
        return 0
    if g_count == 0:
        return +1.0
    if f_count == 0:
        return −1.0
    return (float(2*f_count*ratio)/(f_count*ratio+g_count) − 1.0)
```

In some non-limiting embodiments of the present technology, the calc_score function operates as follows: if the input of the module is a positive number, then the module returns the same number; if the input of the module is a negative number, then the module returns the number multiplied by (−1).

Also note that the calc_score function (or a similar one) may depend on two or more parameters, particularly, on three parameters. In this case, the function may return the informativity number that is directly proportionate to the informativity of a feature. For instance, for three equicardinal classes, the following function (example 3), written in Python, may be used to calculate informativity:

```python
def example3(a1_count, a2_count, a3_count):
    b1 = a1_count / a2_count if a1_count > a2_count else a2_count / a1_count
    b2 = a2_count / a3_count if a2_count > a3_count else a3_count / a2_count
    b3 = a1_count / a3_count if a1_count > a3_count else a3_count / a1_count
    return min([b1, b2, b3])
```

In some non-limiting embodiments of the present technology, classes are considered equicardinal for a certain set (e.g. a training set), if the set contains equal number of elements (chains) of these classes. For instance, in an equicardinal set with two classes—fraudulent action class and legal action class—the number of fraudulent chains is equal to the number of legal chains.

Also, in some non-limiting embodiments of the present technology, for non-equicardinal classes, there may be added at least three values, e.g. ratio1, ratio2, ratio3, which reflect the ratio between the number of elements of each individual class and the number of elements in the largest class. In some non-limiting embodiments of the present technology, one of these three values is always a 1 (one class is the largest, so its ratio to itself is 1), wherein the following function can be defined, which is a correction to example 3 taking into account ratio1, ratio2, and ratio3:

```python
def example3_ratio(a1_count, a2_count, a3_count):
    return example3(a1_count / ratio 1, a2_count/ ratio2, a3_count / ratio3)
```

Using the informativity function (example 3_ratio) n most informative subsequences may be determined (see above).

In some non-limiting embodiments of the present technology, sequence informativity may be determined using another approach. This approach may be illustrated as follows.

A directed forest (gB) is built. Initially, it is empty, i.e. contains no vertices and no trees. Every edge of every tree has two weights corresponding to two classes—F and G: w(F) and w(G). Each vertex is marked with a letter.

A sequence (s)=ABFDSAAADOO is divided into all sorts of subsequences, wherein each subsequence is (max_subsequence_length) long.

For each subsequence, the determination of the most indicative/illustrative features may include:
 traversing all vertices of the graph (gB) in the given subsequence. For instance, for ABFDSAAA there will be a subgraph (gi): A→B→F→D→S→A.
 adding a vertex with weights w(F)=0, w(G)=0, if there is none. Then, depending on the class, the corresponding weight is increased by 1. For a fraudulent subsequence (F), w(F):=w(F)+1; and for a legitimate subsequence (G), w(G):=w(G)+1. Moving on to the next subsequence. After a subsequence is traversed, the algorithm proceeds to the next subsequence.

It results in a graph (gB). Then, a plurality of edges is built, so that the paths to the root are not shorter than min_subsequence_length. Each edge is then scored (see above) using the weights w(F) and w(G). Then, n most probable edges (equal to the number of most indicative features) are selected. Then, for each such edge, a single sequence is built as follows: both vertices or the edge are selected, along with its antecedents. The vertices thus selected are placed in the edge order, where each subsequence refers to an individual feature.

In conclusion, it should be noted that the details given in the description are examples that do not limit the scope of the present technology as defined by the claims. It is clear to a person skilled in the art that there may be other embodiments that are consistent with the spirit and scope of the present invention.

The invention claimed is:

1. A method for training a Machine Learning Algorithm (MLA), the MLA executed by a server, the MLA for classifying a user action sequence that is performed by a user with an electronic service using a computer device, the method executable by the server, the method comprising:
 receiving an indication of interface elements of the electronic service and events associated with the interface elements to be monitored;
 receiving an indication of a given training user action sequence of a plurality of training user action sequences, the given training user action sequence including user interactions with the interface elements and associated timestamps
 receiving an indication of sets of past user action sequences, a given set of past user action sequences is assigned with a respective class of user action sequences of at least two different classes, for which the MLA is to be trained for classifying in-use user actions into;
 generating a training set comprising a plurality of training objects, a given training object of the plurality of training objects being generated based on a respective training user action sequence of the plurality of training user actions sequences, generating the given training object including:
  subdividing the respective training user action sequence into subsequences, by:
   obtaining a max subsequence length to divide the respective training user action into a plurality of sets of the max subsequence length each; and
   obtaining a min subsequence length to divide each one of the plurality of sets into the subsequences so as to define, within a given one of the plurality of sets, for a given subsequence length from the min subsequence length to the max subsequence length, a respective plurality of sub sequences;
  determining, for a given subsequence of the plurality of training user action sequences, a respective frequency value of the given subsequence appearing in each of the sets of past user action sequences associated with the respective class of the at least two different classes;
  determining, for the given subsequence, a respective class as being the respective class associated with that set of past user action sequences in which the given subsequence most frequently appeared;
  selecting, for a given class of the at least two different classes, based on respective frequency values of the subsequences, at least one most informative subsequence indicative of a probability of an in-use user action sequence including the at least one most informative subsequence being of the given class of the at least two different classes; and
  generating, for the respective training user action sequence, a respective vector, a given vector element of which is indicative of whether the respective training user action sequence includes a respective one of the at least one most informative subsequence; and
 using the training set to train the MLA to classify the in-use user action sequence into one of the at least two classes.

2. The method of claim 1, wherein the subdividing the respective training user sequence into the subsequences is further based on the number of most informative subsequences.

3. The method of claim 1, wherein
 the given vector element comprises a respective Boolean feature indicative of whether the respective training user action sequence includes the respective one of the at least one most informative subsequence.

4. The method of claim 1, wherein the given training user action sequence comprises a given one of a plurality past user actions that have been marked as belonging to the at least two different classes.

5. The method of claim 1, wherein the at least two different classes comprise one of a legitimate transaction class and a fraudulent transaction class.

6. The method of claim 1, wherein a number of the at least one most informative subsequence is pre-defined.

7. The method of claim 6, wherein the method further comprises pre-defining the number of the at least one most informative subsequence.

8. The method of claim 7, wherein the pre-defining comprises using a scoring function.

9. The method of claim 1, wherein the selecting the at least one most informative subsequence comprises scoring each one of the subsequences based on the respective frequency values associated therewith, the scoring comprises applying a Gini index $(1-\Sigma_{i=1}^{k} p_i^2)$,
 where k is a number of classes, and
 $p_i$ is a share of an $i^{th}$ class.

10. The method of claim 1, wherein the MLA is a classifier.

11. The method of claim 10, wherein the classifier is based on a decision tree model.

12. A method for classifying a user action sequence that is performed by a user on a computer device in association with an electronic service, the method being executed by a trained Machine Learning Algorithm (MLA), the MLA executed by an electronic device; the method comprising:
   obtaining the user action sequence, the user action sequence defined by at least one event associated with a respective user interaction with interface elements of the electronic service;
   assigning the user action sequence a default class;
   identifying, within the user action sequence, a plurality of subsequences by subdividing the user action sequence, the subdividing comprising:
      obtaining a max subsequence length to divide the user action into a plurality of sets of the max subsequence length each;
      obtaining a min subsequence length to divide each one of the plurality of sets into subsequences so as to define, within a given one of the plurality of sets, for a given subsequence length from the min subsequence length to the max subsequence length, a respective sub-plurality of subsequences; and
      obtaining a number of most informative subsequences;
   generating, for the user action sequence, a respective vector, a given vector element of which is indicative of whether the plurality of subsequences of the user actions sequence includes a respective one of the number of most informative subsequences; and
   feeding the respective vector to the MLA to determine a predicted class associated with the user action sequence; and
   in response to the predicted class being different from the default class, generating a trigger indicative of the user action sequence requiring a remedial action.

13. The method of claim 12, wherein in response to the predicted class being same as the default class, the method further comprises receiving a next user action sequence for determining a respective predicted class thereof.

14. The method of claim 12, wherein the method further comprises training the MLA based on a training set, the trainings set composing a plurality of training objects, each of which has been generated based on a respective training user action sequence of a plurality of training user actions sequences.

15. The method of claim 12, wherein the electronic device is one of the computer device used by the user for executing the user action sequence and a server executing the electronic service.

16. The method of claim 12, wherein the electronic service is an on-line banking application and wherein the method is executable while the user is performing user interactions with the on-line banking application.

\* \* \* \* \*